(12) United States Patent
La Barrie et al.

(10) Patent No.: US 11,991,226 B2
(45) Date of Patent: May 21, 2024

(54) SYSTEM AND METHOD OF DATA ROUTING FOR VIDEOTELEPHONIC SHOPPING

(71) Applicants: Simeon La Barrie, San Clemente, CA (US); Rajeev Dujari, San Francisco, CA (US)

(72) Inventors: Simeon La Barrie, San Clemente, CA (US); Rajeev Dujari, San Francisco, CA (US)

(73) Assignee: OPEN4SALE INTERNATIONAL PTE LTD, Central Business District (SG)

( * ) Notice: Subject to any disclaimer, the term of this patent is extended or adjusted under 35 U.S.C. 154(b) by 0 days.

(21) Appl. No.: 17/388,972

(22) Filed: Jul. 29, 2021

(65) Prior Publication Data

US 2023/0036647 A1 Feb. 2, 2023

(51) Int. Cl.
*H04L 65/403* (2022.01)
*G06F 3/01* (2006.01)
(Continued)

(52) U.S. Cl.
CPC ............ *H04L 65/403* (2013.01); *G06F 3/017* (2013.01); *G06N 3/04* (2013.01); *G06Q 20/085* (2013.01);
(Continued)

(58) Field of Classification Search
CPC .............. H04L 65/403; H04L 65/1089; H04L 65/1093; G06F 3/017; G06N 3/04; G06Q 20/085; G06Q 30/0643
See application file for complete search history.

(56) References Cited

U.S. PATENT DOCUMENTS

| 5,867,494 A | 2/1999 | Krishnaswamy et al. |
| 6,731,609 B1 | 5/2004 | Hirni et al. |

(Continued)

FOREIGN PATENT DOCUMENTS

| CA | 2179337 C | 11/2000 |
| CN | 101543034 A | 9/2009 |

(Continued)

*Primary Examiner* — Michael A Keller
(74) *Attorney, Agent, or Firm* — Fitzpatrick PC (57) ABSTRACT

A system for data and signal routing for videotelephonic conferencing is provided. The system has a video recognition module in communication with a merchandise database, wherein the video recognition module is configured to recognize an article in-video during the telephonic conference and match it to an item in a merchandise database, a gesture module configured to recognize a user gesture and further configured to communicate the gesture to the video recognition module, a persisted cart module in communication with the gesture module and the video recognition module, wherein the persisted cart module is, in response to an input from the gesture module, configured to automatically populate both a customer interface associated with the customer and a merchant user interface associated with a merchant with a graphical cart that appears in-video on both user interface, and a display configuration module in communication with the persisted cart, wherein the display configuration module is configured to transform the article in-video to a digital graphical representation of the article in video and store it in the cart on both user interfaces.

19 Claims, 8 Drawing Sheets

(51) Int. Cl.
*G06N 3/04* (2023.01)
*G06Q 20/08* (2012.01)
*G06Q 30/0601* (2023.01)
*H04L 65/1089* (2022.01)
*H04L 65/1093* (2022.01)

(52) U.S. Cl.
CPC ..... *G06Q 30/0643* (2013.01); *H04L 65/1089* (2013.01); *H04L 65/1093* (2013.01)

(56) References Cited

U.S. PATENT DOCUMENTS

| | | |
|---|---|---|
| 6,795,851 B1 | 9/2004 | Noy |
| 7,302,053 B2 | 11/2007 | Chang et al. |
| 8,321,502 B2 | 11/2012 | Scoda |
| 8,330,795 B2 | 12/2012 | Iyer et al. |
| 8,330,798 B2 | 12/2012 | Hwang et al. |
| 10,341,400 B2 | 7/2019 | La Barrie et al. |
| 2006/0004690 A1 | 1/2006 | Beartusk et al. |
| 2006/0062367 A1 | 3/2006 | Christenson et al. |
| 2009/0094367 A1 | 4/2009 | Song et al. |
| 2009/0135743 A1 | 5/2009 | Kowalewski |
| 2011/0137973 A1 | 6/2011 | Wei et al. |
| 2011/0271192 A1 | 11/2011 | Jones et al. |
| 2013/0007212 A1 | 1/2013 | Orr et al. |
| 2013/0041953 A1 | 2/2013 | Renner et al. |
| 2014/0100993 A1* | 4/2014 | Farmer ............... G06Q 30/0251 705/27.1 |
| 2014/0139614 A1 | 5/2014 | Swanson et al. |
| 2015/0039458 A1* | 2/2015 | Reid ..................... A61B 5/117 705/26.1 |
| 2019/0347685 A1* | 11/2019 | Glazier ................ H04L 67/535 |

FOREIGN PATENT DOCUMENTS

| | | |
|---|---|---|
| CN | 101635724 A | 1/2010 |
| CN | 102130923 A | 7/2011 |
| IN | 100571104 C | 12/2009 |
| JP | 5620134 B2 | 2/2011 |

* cited by examiner

FIG. 8 under the existence of the test environment shown in FIG. 1.

SYSTEM AND METHOD OF DATA ROUTING FOR VIDEOTELEPHONIC SHOPPING

FIELD OF THE INVENTION

The present disclosure relates to data and signal routing for videotelephony. More particularly, the present disclosure relates to system and method for providing videotelephonic shopping experiences and purchasing ability during a live in-video conference between a customer and a merchant.

BACKGROUND

Conferencing through various forms of media has rapidly evolved in the last few decades, particularly due to the introduction of low-cost, high-capacity communications networks. Videotelephony (i.e., video conferencing) and videophone calling, in particular, have made significant strides due in part to the development of tablet computers and smart phones, but also globalization of the market. With increasing travel costs, businesses and organizations have turned to conferencing to save on expenditures and/or increase contact. Interpreted broadly, a conference may be viewed as a construct for organizing related interpersonal communications over a communications network.

Generally, in these networked settings, such as over the Internet or local area networks, conferences take place between multiple parties or users using audio and/or video and/or feeds. In a conventional system, users may be invited to, or join a conference via the user's identifier (or alias thereof). An organizer of the conference may invite other users, who may be viewed as "participants" in a conference. A participant may have a persistent identity that is authenticated, or, optionally, may be permitted to join the conference without software authentication of his identity. In either case, participants may be assigned privileges and are authorized to effect various changes to the state associated with the conference. Conferences may be either non-authenticated, or include at least one authenticated participant.

In a purely non-authenticated conference, each user participant may join the conference based on the conference identifier (or alias thereof), without a user identity being checked by a server. Each user may receive an alphanumeric pass-code that determines the role of the participant within the conference session, and each role is authorized with a set of privileges to effect changes to the conference. Pass-codes may be unique to a user or shared by multiple users. User participants with a conference identifier or pass-code may join a conference through self identification. For example, non-authenticated participants may be initially placed on hold in a conference lobby until their identity can be verified by ad-hoc means by the other participants. Optionally, non-authenticated participants may be admitted directly to the conference session, leaving it up to authorized participants to notice the non-authenticated participant, and decide whether that participant is a welcome guest versus an undesired intruder who should be ejected from the conference session.

In an authenticated conference, on the other hand, a user identity may be checked by a server. Many of today's authenticated conferencing systems are consumer-to-consumer oriented and use a flat namespace, meaning that user identities are peers to one another. In these circumstances, there is no way to determine strictly from the identity whether any two users are members of the same organization, such as a business entity, civic association, or family for example. For example, in a typical Customer Relationship Management (CRM) system, a consumer who initiates contact with the business is connected to the next available representative. Both the consumer and call representative spend time authenticating the consumer and locating the account. Beyond the consumer possibly selecting the appropriate department through voice menu prompts, neither the consumer nor the target organization has any influence on routing the consumer to the best representative for them.

Recently, The COVID-19 pandemic, also known as the coronavirus pandemic, is a pandemic of coronavirus disease 2019 (COVID-19), caused by severe acute respiratory syndrome coronavirus. The World Health Organization declared the outbreak a Public Health Emergency of International Concern on 30 Jan. 2020.

In response, many governments across the world have either declared or recommended that people "social distance" to obviate the spread of the disease. In public health, social distancing, also called physical distancing, is a set of non-pharmaceutical interventions or measures intended to prevent the spread of a contagious disease by maintaining a physical distance between people and reducing the number of times people come into close contact with each other. It typically involves keeping a certain distance from others (the distance specified may differ from time to time and country to country) and avoiding gathering together in large groups. In the United States, "non-essential" employees worked almost entirely from home, and government issued stay at home orders. Most people did not leave their unless it was for essential items.

To say this had a severely negative effect on the brick and mortal retail industry would be vastly understating it. In fact, many retailers were simply forced to close or declare bankruptcy or transition to digital. The virus has led to many major retailers and companies to bankruptcy protection. Others lost saw sales falls by well over 50%. While online shopping (digital shopping) helps to curtail some of these losses, there are clear drawbacks to digital shopping including but not limited to losing the personal relationship with the sales representative who assist the customer in the shopping process and choose items that most fit the customers likes and needs.

Payment in the context of e-commerce is generally by credit or debit card via a payment gateway is a software set up as a part of your website to enable customers and other businesses to complete onsite transactions and is responsible for authorizing and processing payments and securely delivering payments to accounts. Payment gateways require merchant accounts, whereby the gateway authorizes the payment to the merchant account, and it is recommended you contact an online payments eCommerce service Provider. Payment gateway software allows credit and debit card payments to take place securely and rapidly over the Internet for years. Both a merchant account and a payment gateway are needed to make online payments.

However, these payment solutions are one-dimensional and directed toward static checkout processes after a customer chooses items to purchase online.

As such, there is a need for a robust and secure data an signal routing schema for "in-videoconference" payment system and methods.

SUMMARY OF THE INVENTION

To achieve the foregoing and other aspects and in accordance with the purpose of the invention a system and method for providing videotelephonic shopping experiences and purchasing ability during a live in-video conference between a customer and a merchant is disclosed.

An objective of the present platform is to provide in video conference purchasing functionality (e.g., cart) allowing a consumer to purchase an item during a live call of item that is being shown to the consumer on the video call the merchant/salespersons.

An objective of the present platform is to provide a "1:1 sales" shopping conference, where a single merchant assists a buyer with their purchases. Merchants can demonstrate physical versions of Products over audio/video channels and add the corresponding or similar product to a digitized cart (e.g., live video to digital with all meta data attached ere to such as price, size etc.).

Another objective of the present platform is to provide a "multi-party" shopping conference, where buyers can influence one another's purchasing decisions. The influence can occur through audio/video/chat discussion, or by signaling upvotes/downvotes on products, for example.

A system for data and signal routing for videotelephonic conferencing is provided. The system has a video recognition module in communication with a merchandise database, wherein the video recognition module is configured to recognize an article in-video during the telephonic conference and match it to an item in a merchandise database, a gesture module configured to recognize a user gesture and further configured to communicate the gesture to the video recognition module, a persisted cart module in communication with the gesture module and the video recognition module, wherein the persisted cart module is, in response to an input from the gesture module, configured to automatically populate both a customer interface associated with the customer and a merchant user interface associated with a merchant with a graphical cart that appears in-video on both user interface, and a display configuration module in communication with the persisted cart, wherein the display configuration module is configured to transform the article in-video to a digital graphical representation of the article in video and store it in the cart on both user interfaces.

In embodiments, a non-transitory computer-readable medium for storing instructions that, when executed on one or more processors, during a videotelephonic conference, cause the one or more processors to query a database and recognize an article in-video during the telephonic conference via a video recognition module in communication with a merchandise database, match the article to an item in a merchandise database, recognize a gesture of a customer in-video and communicate the gesture to the video recognition module via a gesture module, automatically populate, in response to an input from the gesture module, both a customer user interface associated with the customer and a merchant user interface associated with a merchant with a graphical cart that appears in-video on both user interfaces and transform the article in-video to a digital graphical representation of the article in-video and store it in the cart on both user interfaces.

A method for data and signal routing for videotelephonic conferencing in a system including a client device is provided and works with a cloud server in communication with the client device, wherein the cloud server comprises a memory to store instructions and a processor coupled with the memory to process the stored instructions is provided. The method comprises the steps of receiving an input that a customer has selected a merchant within a virtual marketplace and has requested the videotelephonic conference, outputting a call request to the merchant for an availability for the requested videotelephonic conference, receiving an update from the merchant using a merchant presence server, wherein if the merchant later joins a sales interaction, the merchant presence server updates a merchant presence at the cloud service of merchant's interest and the merchant is placed on standby to be selection by the merchant presence server, creating a conference object and initiating an identify merchants service, querying a customer database and outputting consumer preferences to a merchant user interface associated with the merchant, and joining the customer and the merchant via the conference object.

Other features, advantages, and aspects of the present system will become more apparent and be more readily understood from the following detailed description, which should be read in conjunction with the accompanying drawings.

BRIEF DESCRIPTION OF THE DRAWINGS

The present system is illustrated by way of example, and not by way of limitation, in the figures of the accompanying drawings and in which like reference numerals refer to similar elements and in which.

DETAILED DESCRIPTION OF THE EMBODIMENTS

The present system is best understood by reference to the detailed description and examples set forth herein.

Embodiments of the system are discussed below with reference to the examples. However, those skilled in the art will readily appreciate that the detailed description given herein with respect to these examples is for explanatory purposes as the system extends beyond these limited embodiments. For example, it should be appreciated that those skilled in the art will, in light of the teachings of the present system, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the system that are too numerous to be listed but that all fit within the scope of the system. Also, singular words should be read as plural and vice versa and masculine as feminine and vice versa, where appropriate, and alternative embodiments do not necessarily imply that the two are mutually exclusive.

"Conference" and "conferencing", as used herein, may take place between multiple user's parties, and may occur in any known media type. Non-limiting examples of media types include audios, videos, pictures, images and textual information. Additional information may be attached or linked to the media for purposes of furthering the interaction between the parties. Non-limiting examples of additional information which may be attached or linked include videos, audios and text.

The term "article" may be an item the buyer is looking at or the seller is showing. In-video, it may be referred to as "article" while in database it may be referred to as "item", hut may be used interchangeably herein.

The term "customer" refers to a user or buyer.

The term "merchant" refers to a seller or an organization that is selling.

In the processor-based system and method of the present invention, a plurality of users may log on to the client-side website, through for example, a graphical user interface on a device such as a personal computer, tablet computer, or mobile phone. The user agent may communicate with one or more servers for example, that comprises, amongst other features, one or more CPUs, microprocessors, RAM/ROM, mass data storage for personal attributes and stored files and like. Tasks performed by a server may be distributed to multiple software processes on multiple computers, and a skilled practitioner to optimize speed, scale, cost efficiency, and/or reliability by refactoring server configurations and roles. It will be understood by those skilled in the art that communication systems may take many different forms including local area networks (LANs), wide area networks (WANs), wired telephone networks, wireless networks, or any other network supporting data communication between respective entities.

Figure 1:
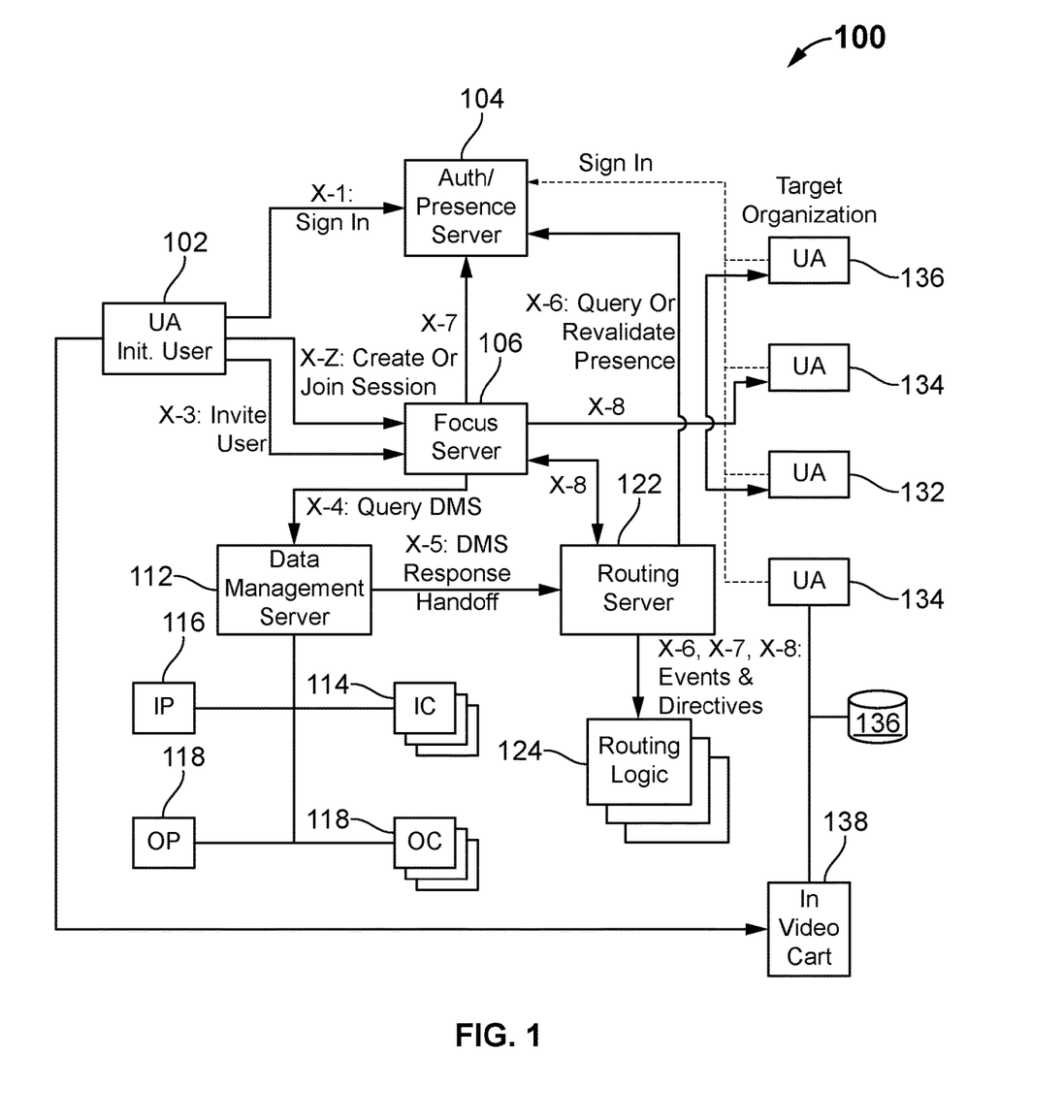
FIG. 1 is a block diagram combination block and stepwise diagram showing a signal and data routing schema and an in-video cart in accordance with embodiments of the present invention.

The present invention will now be described in detail with reference to embodiments thereof as illustrated in the accompanying drawings. Referring to FIG. 1, a block diagram together with a stepwise diagram depicting a processor-based method and system which operates over a network, such as a global network or LAN, for example, shown generally at 100. As shown, a UA 102 may be coupled to an authentication server 104. The user agent may sign in, step X-1, through communication with the authentication server 104. The authentication server 104 may be configured to verify the user's identity upon UA sign-in and maintain a presence state for the user.

The user agent 102 may be further coupled to a focus server 106. The focus server 106 may be configured to allow the UA 102 to create a new conference session or join existing session and manage joining of other UAs, among other server functions. The focus server 106 may be further configured to receive join requests from UAs who have received an invitation URL or other token that permits them to join the session. Additionally, a UA 102, on behalf of the initiating user once joined to the session may invite another user to join. In this circumstance, the focus server 106 may be further configured to directly query the presence information of that user and then be communicatively coupled with one or more of their UAs. Additional invited users may have one or more user agents join or exit the session in any order via invite functions. step X-3, until the session is later terminated either by an authorized user or when the last authorized user agent exits the conference.

A participant in an authenticated conference, if so authorized, may cause a user to be connected or bridged into the session though focus server 106, which is further coupled to authentication server 104. In this way, when a user agent 102 invites a target from an organization 110, one or more of user agents 128, 130, 132 may be invited to join the session.

The focus server 106 may be further coupled to a data management server (DMS) 112. In this exemplary embodiment of the present invention, the focus server 106 may delegate the invitations requests and signals to the DMS 112. In optional embodiments of the present invention, the DMS 112 may be integrated within the focus server 106.

In this embodiment, the DMS 112 may be configured to gather and construct persisted data associated with each users identity, and managed by Internet servers. Such data may be collected directly from the user, for example when signed in through their user agent 102 or may be gathered by other means and updated by software processes. The context may include individual context 114 (IC) that is specific to each organization the consumer has interacted with and a single individual profile 116 (IP) that spans the interactions within different organizations. The DMS 112 may store, maintain various data records in a plurality of forms, and mediate access to records. For example, the data records may be represented in any number of ways, such as database records that may be accessed by query, a serialized format in text or binary, that is stored in a file system or transmitted on a network, or an object model that is accessed through code. Each of the data records may be versioned (as a whole and/or assigned to various parts) so that they may be cached or replicated, in whole or in part. Optimistic concurrency techniques may be applied to reads and writes of the data records. In an optional embodiment of the present invention, since it is not necessary for routing logic 124 to act based on the most updated data records, longer revalidation intervals may be used when there is little detriment to less recent data records. Further, revalidation may occur asynchronously, after using a cached data record.

In this exemplary embodiment, each user identity may have a single individual profile 116. The profile may contain data including but not limited to: demographic data, preferences and interests, financial info, such as: online wallet with payment instruments, credit rating, cumulative spend history, other personal information. Each user may have multiple individual context records 114, one for each organization 110 they have contacted. For example, each individual context record may contain data including but not limited to: customer identifier(s) that may be used as foreign keys into the organization's customer database 136, history of past contacts with that organization, any ratings or favorites of that organization, history of past purchases with that organization, other data the organization would like to record in the IC 114 for future use.

Like each user, each organization may have an organization profile record (or "OP") 118. Each organizational profile may contain data including but not limited to: entity registration info, such as the entity's principal business address, link to the organization's website, business accreditations and ratings, categories of product/services bought, categories of product/services sold, and the like.

Further, each organization 110 may have organization context records 120, e.g., one for every other organization that has been contacted by any individual affiliated with that organization. Each organization con text record (or "OC") 120 may contain data including but not limited to: organization identifier(s) that may be used as foreign keys into the organization's customer database, the status/expiry of a nondisclosure agreement between the organizations 110, contact history between the organizations 210.

The data management server 112 may be further configured to mediate both read and write access to the aforementioned data records (114-120). When receiving a read request, the DMS 112 may restrict and transform the data that is provided to the organization being contacted. For example, in an exemplary embodiment, the initiating UA may have a credit rating in their OP 118. The DMS 112 may, according to the initiating individual's consent, provide the credit score to certain categories of organization, or provide it later once consent is established. When such a credit score is provided, the data DMS 112 may provide the raw score, or transform it in some way, such as mapping the score to one of a set of predetermined ranges that are meaningful to the organization receiving the OC 120, for example to route the individual the e optimal representative(s) and/or provide the information to the selected representative(s) of the organization 110. The DMS 112 may filter out data elements (another form of subset) when specified by Routing Server 122, for the sake of network and computation efficiency whenever those elements are known to be irrelevant to the routing logic 124. The DMS 112 may vary its response to the same query depending on the user, for example the DMS 112 may return different results to the focus server 106 then a query from another system.

The DMS 112 may be further configured to mediate write requests, which may be concurrent with the conference session, since the user may be concurrently involved in multiple conference sessions, or because updates are being performed outside of any conference sessions. The DMS 112 may use optimistic concurrency, where writes are accepted only if based on the same version number; or alternatively, the DMS 112 may accept writes out of order and reconcile any conflicts. The DMS 112 may also be configured to mediate which writers have permissions to change data elements. For example, the IC 114 and OC 120 are specific to communications with one organization that would usually have full write access. In contrast, the IP 116 and OP 118 are used across communications with many organizations, and thus may be subject to greater restrictions on write access by a single organization.

Referring still to FIG. 1, the DMS may be further coupled to the routing server 122, may be commutatively coupled to various routing logic 124. In an optional embodiment of the present invention, the routing server may comprise the routing logic 124 (i.e., the routing logic 124 may reside on the routing server 124). The routing server 122 is configured to take data record results from the DMS 112, and select and execute the appropriate routing logic 124 for the target organization. As a result of output directives from the routing logic 124, the routing server 122 may take a number of actions including but not limited to: querying the authentication server in step X-6 for a list of users meeting certain criteria, and pass them back to the routing server 122, fetching presence state for particular user(s) from the authentication server and to be passed back to the muting logic 124, directing the focus server 106 to invite a user from the organization to join the conferencing session, directing the focus server 106 to invite a user from the organization to join the conferencing session on a provisional basis, and directing the focus server 106 to finalize a provisionally invited user to join the conference, or be rejected from the conference (or ejected) if already joined. In an optional embodiment, the routing server 122 may be integrated within the focus server 106. In another alternative embodiment, some functionality of routing server 122 may be integrated within the presence management components of the authentication server 104.

In an exemplary embodiment of the present invention, the routing logic 124 may be configured to be customizable for each organization 110 that is contacted. In this circumstance, routing logic 124 is consulted by the routing server 122, when the routing server 122 interacts with the authentication server 104 to query user presence, as well as when the routing 122 server works with the focus server 106 to invite and join selected users.

In an exemplary embodiment of the present invention, the routing logic may be arbitrary code. Arbitrary code may be an engine that interprets declarative rules, or it may be an algorithm template with parameters set for each organization, for example a formula that scores each candidate user on a number of parameters, each weighted by a factor, and accumulated. Routing logic may be executed locally, remotely, or a combination thereof, for example simpler local logic that is executed and used if remote logic is unreachable or times out.

Initially, the routing logic 124 takes a number of inputs, including, the target username invited by the UA, which may be a particular user or an alias, data records (IP', IC, OP', OC) as restricted, transformed, and filtered by the DMS 112, other information conveyed by the initiating UA 102, for example a more recent location fix of the user than might be found in their presence state, the presence state of the organization's users, data from the organization's 110 directory, such as: Attributes such as department, cost center, title, level, and so forth, group memberships, reporting hierarchy, office location, other attributes of the organization's users, such as: certifications, awards, elite status, hours of training, ratings, etc. The routing logic 124 may use time elapsed since the request in order to keep computation time bounded, providing a balance between optimal results vs. keeping users waiting too long. The outputs of the routing logic 124 include directives to the routing server 122 such as: Query for user's presence, invite a user to join conference, possibly in a provisional state, finalize a provisionally invited user by either joining the user to the conference or ejecting the user.

The routing logic 124 may receive updates via the routing server 122 from the focus server 106 on the state of invited users joining the conference. Based on these updates, the routing logic 124 may issue additional directives to the routing server 122. The routing logic 124 determines when it has completed executing and will no longer generate additional directives for the invite request.

Figure 2:
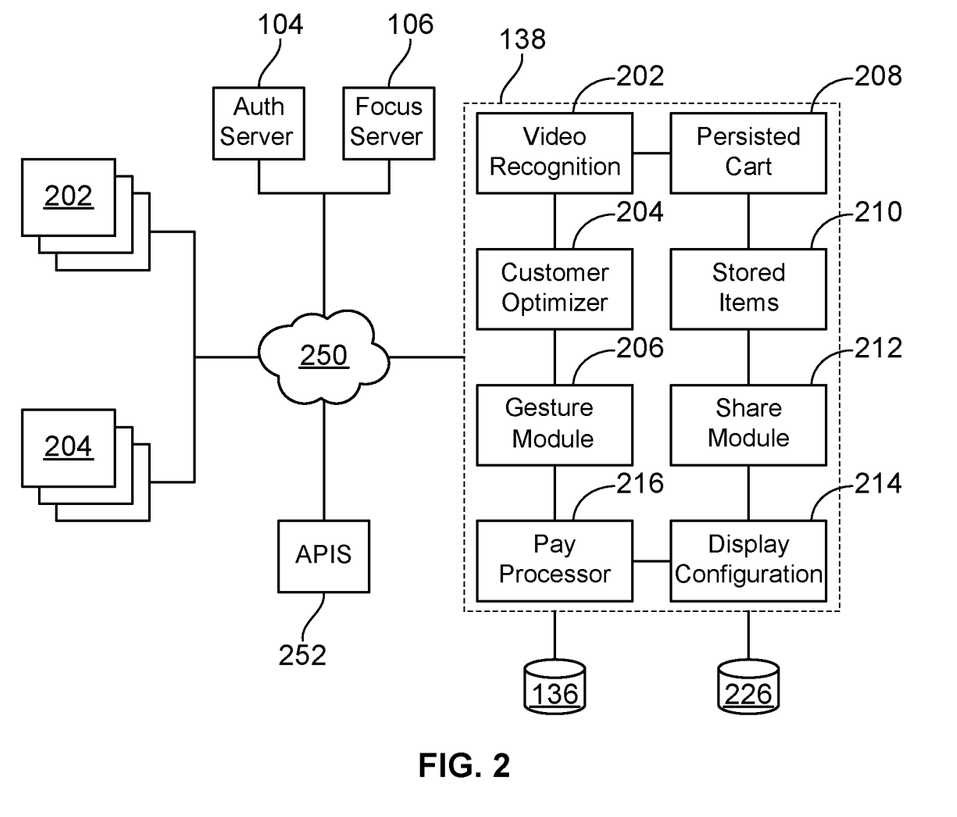
FIG. 2 is a block diagram showing components and connections between an in-video cart and users of a videotelephonic platform according to an embodiment of the present platform.

With reference now to FIG. 2, is a block diagram showing components and connections between an in-video cart and users of a videotelephonic platform according to an embodiment of the present platform is shown. The plurality of user 202 and 204 (i.e., UA 102 of FIG. 1) is shown in communication with in-video cart 138 via network 250 and application program interfaces (APIs) 252. The authentication server 104 is in communication with the network 250 and may be configured to verify the user's identity upon UA sign-in and maintain a presence state for the user. Focus server 106 may be in communication with network 250 and may be configured to allow the UA 102 to create a new conference session or join existing session and manage joining of other UAs, among other server functions for which the cart 138 is used.

The in-video 138 cart comprises a video recognition module 202, a customer optimizer module 204, a gesture recognition module 206, a persisted cart module 208, a stored item module 210, a share module 212, and a display configuration 214. The video recognition module 202 is in communication with a merchandise database 226 and is configured to recognize an article or item in-video and match it to an item in the merchandise database 226 that stores images, data and meta-data of articles or items. In operation, the merchandise database may be based on an e-commerce platform type database and all images of the articles are save therein. The video recognition module 202 utilizes video analytics, neural networks, and other forms of video recognition to match an article being shown in the video with the data and metadata associated with the item (e.g., price, color, size, brand). In this way, during a video conference shopping session when the merchant is showing the shop or an item in the system automatically recognizes what item that is during the actual video shopping process. This allows the system to prepare that item for purchase if the buyer would like to purchase it from the merchant.

Still with reference to FIG. 2, the customer optimization module 204 is in communication with the merchandise database 226, the video recognition module 202 and the customer database 136. The customer optimization module 204 is configured to use data from previous buyer purchases to perform the matching step more effectively based on past purchases by the buyer. In operation the customer optimization module 204 may be in communication with the neural network or other artificial intelligence to improve the video recognition of items in the database overtime.

A gesture module 206 is in communication with the video recognition module 202, the customer optimizer 204, and a persisted cart 208 to be discussed with greater detail herein. The gesture module 208, in operation, is configured to recognize a buyer's gesture and communicate with the video recognition module 202 to store the merchandise in the persisted cart. As an example, if a merchant is showing a shop or an item that the buyer would like to buy in video, the buyer can use a finger or their mouse to drag that item across the screen into the persisted cart 208 where it is digitized into an e-commerce style item (e.g., live item to digitized item). While using a finger to drag drop or a mouse to drag drop is useful in embodiments any other gesture maybe used herein (e.g., eye tracking, brainwave tracking or audio signals). The persisted card module 208 is configured to populate both a user interface and an organization interface with a graphical cart (e.g., e-commerce cart). Thus, when a user would like to purchase they utilizes the persisted cart module 208 which is populated, automatically, on both the merchant UI and the buyer UI so that each can see the items in the cart utilizing the stored item module 210. The stored item module 210 is in communication with persisted cart 208 and configured to save the items in the cart for later viewing by either the buyer or the merchant.

In some embodiments, a share module 212 is in communication with the stored item module 210 so that users can share items they would like to purchase with each other in the video, specifically, while in group shopping sessions or shopping sessions being led by an influencer, as described later with reference to FIG. 8.

Referring still to FIG. 2, the display configuration module 214 is in communication with the persisted cart 208 and configured to transform the merchandise from live video to a graphical representation of the item and store it in the cart on both user interface and organization interface. A payment processing 216 is further provided to store payment information connected to a user. In embodiments, an organizational customization module may be provided so that the system recognizes the organization and automatically converts system settings based to that organizations optimization input using an automatic video to photo editor, as an example. However, as used herein "digitizing" an article in video refers to transforming into pictorial or drawings form that one may see the article as a rendering in cart (similar to a pure e-commerce shopping experience).

In embodiments, each buyer may have one or more cart constructs, which are used to contain products for prospective purchase. In embodiments, the products placed in the cart may persist across buyers joining and leaving a shopping conference.

For example, a primary cart may be used to hold items that are ready for purchase, while a secondary cart may hold items that may be contemplated for future purchase, including being shifted to a primary cart. In operation, buyers can add products from the catalog into their own cart's buyers can remove, or modify (quantity, color, etc.) any product in their own carts. Buyers may be permitted to view carts belonging to other buyers. Buyers may not directly modify the carts belonging to others, however, they may be permitted to influence the display of those carts through signaling. Buyers can customize their UI view (minimize, layout etc.) of any cart and merchants can modify a cart of any buyer (e.g., add, remove, or modify products).

Figure 3:
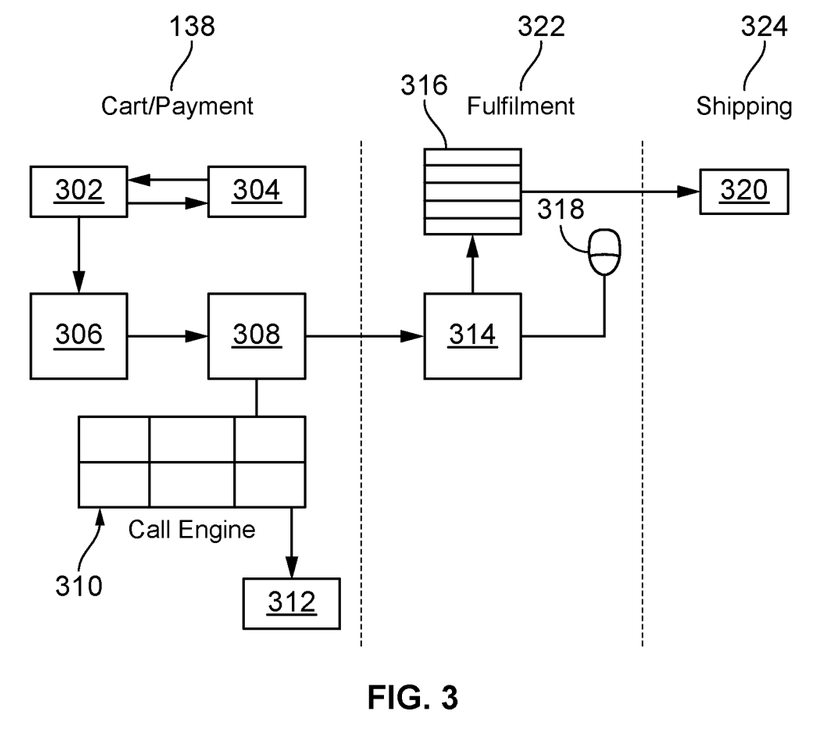
FIG. 3 illustrates a supply chain block diagram according to an embodiment of the present platform.

Referring now to FIG. 3, a supply chain block diagram according to an embodiment of the present platform is provided. Cart 138 is shown together with fulfillment 322 and downline shipping 324. Cart 138 may be in communication with smart contracts 302 or bills of sale 304 in some embodiments, as the present platform may be used across many verticals 306. For example, a wholesale and manufacturing entities that utilize bills of laden 308 may utilize the system. In this way, the call engine 310 is and in communications with the smart contracts so that a black chain may be employed 312. Once payment is made, downline, a fulfillment center 314 received the notification regarding the contract or purchase and use his fulfillment module 314 to fulfill a plurality of orders on the order module 316. Once fulfilled appropriately, the blockchain 312 via call engine 310 closes the contract once shipping module 320 notifies it of successful delivery.

In operation, a buyer and a merchant or a customer and a merchant may engage in a number of interactions over the system for which the system utilizes specific data routing and signal routing to optimize the revenue to the merchant and ease-of-use for the customer. A buyer may add or remove a live in-video item into a digital product into a digital cart after the merchant shows physical product over the video. Further, a merchant may add or remove an in-video product into the digital cart. In the merchant may offer buyer shipping options for any physical goods initiate a bill of sale on a cart for the buyer's review, and the merchant may reject the bill of sale and return it for revision. The buyer may accept the bill of sale and then the purchase is authorized by the server's payment gateway, though for some payment instruments, this may include showing a QR code to the buyer to accept in their payment app. Then, a confirmation email is sent to the buyer and the fulfillment process Is initiated with the merchant.

Figure 4:
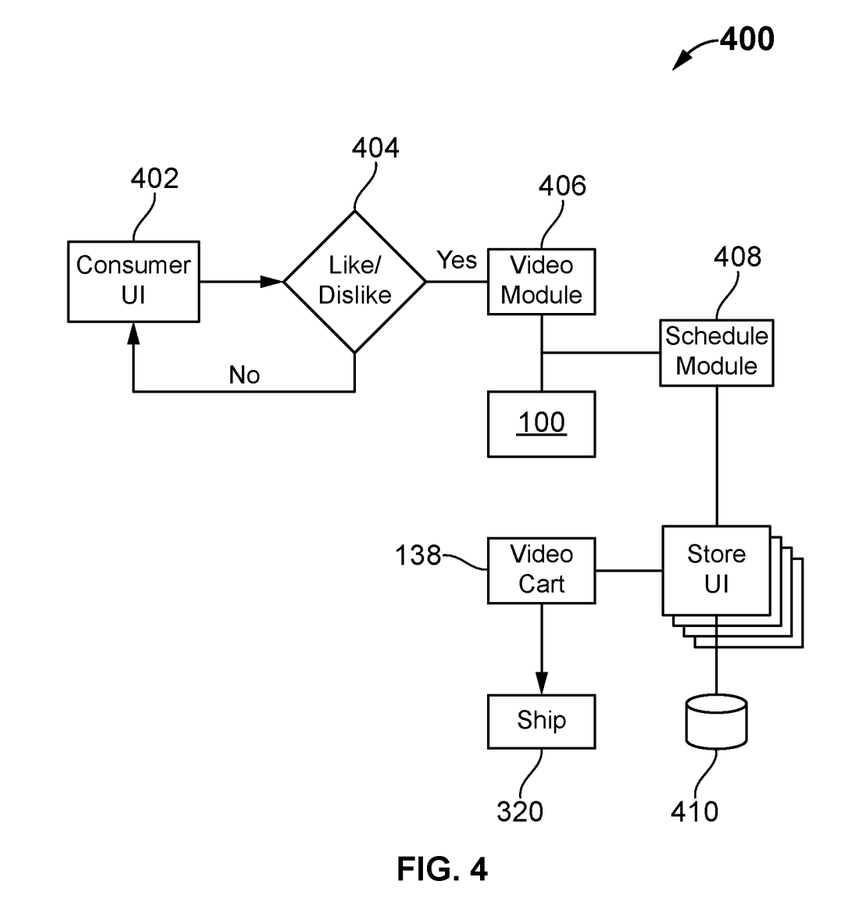
FIG. 4 illustrates a combination system and method block diagram for an in-video purchasing according to an embodiment of the present platform.

Referring now to FIG. 4 illustrates a combination system and method block diagram for an in-video purchasing is shown. The system comprises a consumer UI 402 configured to view certain products or a product catalog. The consumer at the module 402 may like or dislike 404 a product. If the consumer likes it, the system shown in in FIG. 1 at 100 interacts with video module and scheduling module 408 to schedule a video conference to utilizing video module 406.

Once scheduled, the store UI 412 is populated and connected to the consumer UI for an in-video shopping experience as it relates to the item in the catalog of items (e.g., via the web portal) to make a purchase at cart 138 where it then ships 320. In operation, each participant has their own device (phone, tablet, web browser, etc.), and the system classifies of classifies each into a role such as buyer or merchant. In operation, merchants generally have a higher level of permissions over interactions within a conference. An active conference must have one or more buyers, and zero or more merchants. In this way, the system sets up a plurality of conference channels may include but are not limited to audio, video, chat, reactions, and signaling of control messages interpreted by Devices. Participants may be connected in a full mesh or in various subsets.

Figure 5:
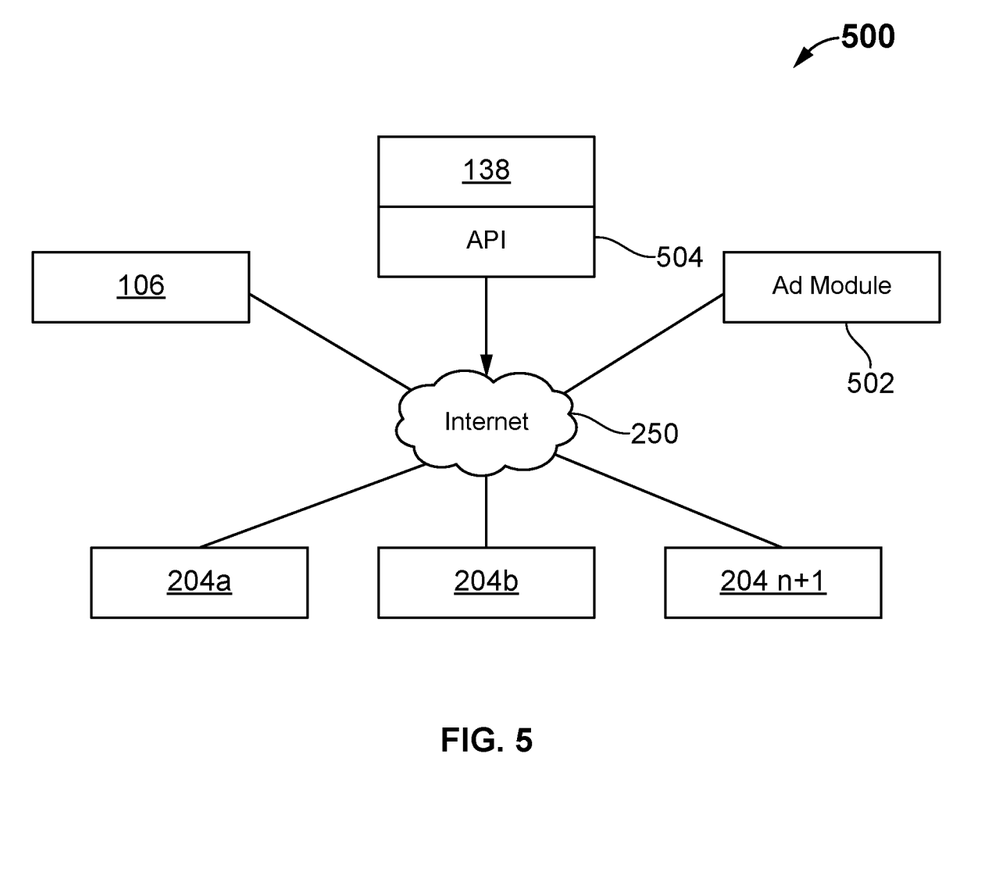
FIG. 5 illustrates a networked block diagram for in-video purchasing according to an embodiment of the present platform.

Referring now to FIG. 5, a networked block diagram for in-video purchasing according to an embodiment of the present platform is provided. The cart 138 together with API 504 allows customer user interfaces 204A, 204B, 204 n+1, to communicate with focus server 106 and an advertising module 502. The advertising module 502 is configured to track user purchase and target advertisements in video as a digitized advertisements in live video sessions based on what the user is browsing and the video recognition module of FIG. 2.

Figure 6:
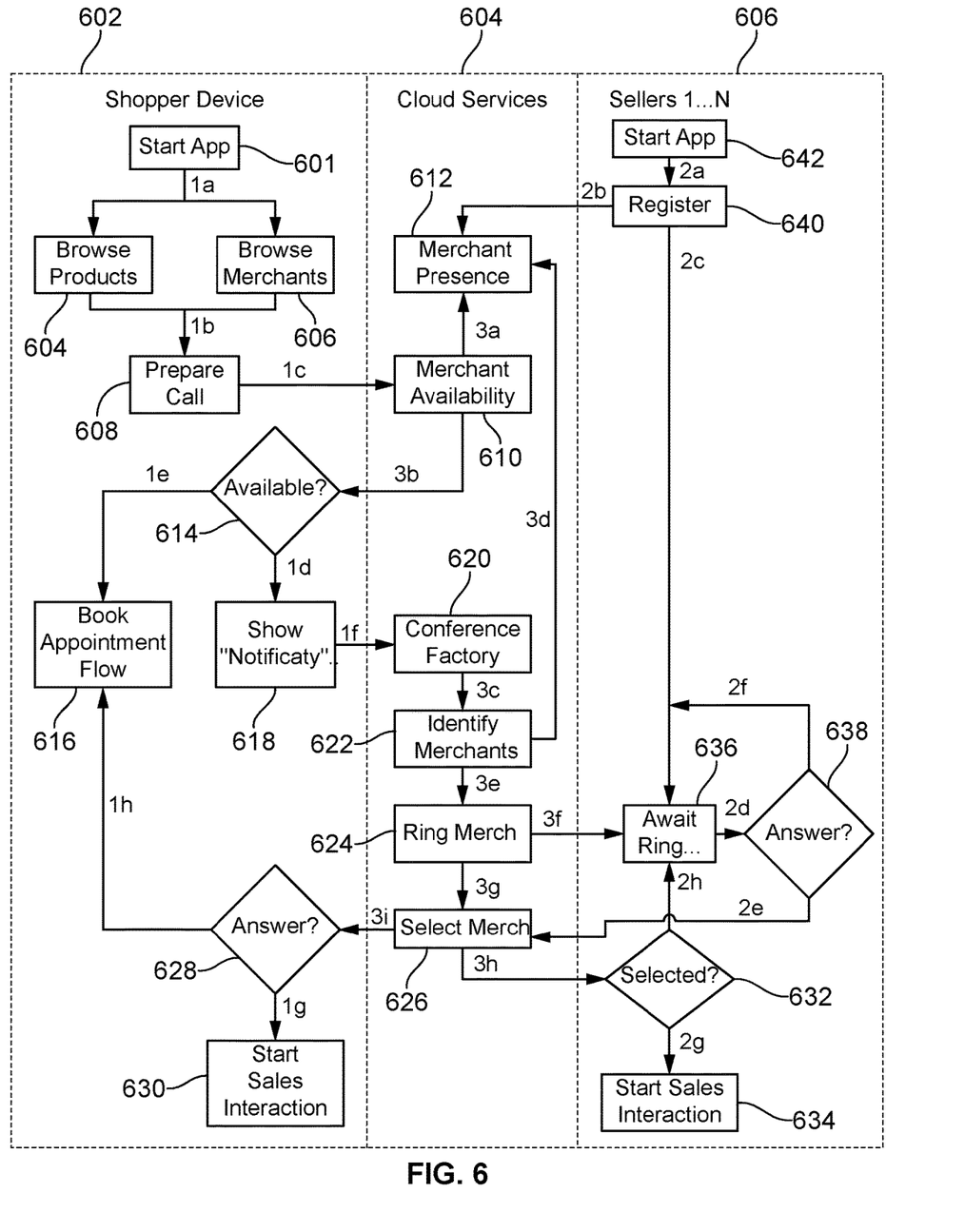
FIG. 6 illustrates method user's making purchases via a videotelephonic platform according to an embodiment of the present platform.

Referring now to FIG. 6, a combine method and system diagram showing a platform for user's making purchases via a videotelephonic platform according is shown. The combine diagram is broken up by buyer device 602, cloud services 604, and merchant device 606. In the cloud services, all logic may include customizations that are specific to the merchant and are adjustable by the system automatically over time. At start module 601, the buyer opens application on their device, such as but not limited to opening the app icon, clicking a hyperlink, or opening a message (step 1*a*). At browse module 604, the buyer browses product, or selects merchant within a virtual marketplace, and decides to inquire with merchants at the browse merchant module 606 (step 1*b*). At prepare call module 608, the buyer's app requests merchant availability from a cloud service to prepare a call and find merchant availability module 610 (step 1*c*). The call request may include the GPS location on the buyer's device if the application has permission to obtain it, or another location such as their default shipping address. The call request may include information that helps the cloud service locate previous sales appointment booking module 616.

If the buyer's app receives an affirmative response to the request in step 1*c*, it proceeds to show the app is notification module 618 buyer is shown appropriate messages, such as "ringing" or "locating sales personnel." If instead the buyer's app receives a negative response to the request in step 1*c*, the app takes the buyer to a UI flow to book a call with the merchant booking module 616 (step 1*h*). The buyer may complete the flow or return to other activities within the app. The system shows the buyer it is "ringing" the merchant and submits its info to a cloud service to join the conference factory module 620 (step 1*f*). If the buyer's app receives an affirmative response to the request in step 1*f*, the app proceeds to the sales answering module 628 and interaction module 630 (step 1*g*). If instead the buyer's app receives a negative response to the request in 1*f*, the app takes the buyer to a UI flow to book a call with the merchant appointment module 616. The buyer may complete the flow or return to other activities within the app.

On the merchant side 606, merchants prepare for buyers at merchant start module 642. The merchants open an application on their device and register module 640 (step 2*a*). The merchants update their availability as available with the merchant presence server on the merchant presence module 612 (step 2*b*). Should the merchant later join a sales interaction, take a break, or log off, their presence will similarly be updated by the cloud server. The Merchant presence module 612 may include the GPS location on their device if the application has permission to obtain it, or another location such as their home store. At await ring module 636 (step 2*c*), the merchant awaits ringing to join sales interactions they may be interested in. If they are interested, they may await ring at await ring module 638 (step 2*e*), they notify a cloud service of their interest and go on standby to be selected step 626 (step 2*f*). If instead the merchant rejects or waits too long to accept the request made to them in step 2*d*, they return to the await ring module 636. If the merchant receives an affirmative response to the request made at step 638 (step 2*e*), they are taken out of standby and become visible in the sales conference 620. As part of the joining the sales interaction, the merchant presence module updates presence on the cloud. If instead the merchant receives a negative response to the request step 2*e*, they return to the await ringing state.

On the cloud services section 604, it is configured via signal and data routing to prepare buyers and merchants for a live interaction. When the merchant availability module 610 receives a request (step 3*d*), it checks to see if the caller has an appointment (database not shown), or else queries the merchant presence module 612 for the number of merchants that are currently (step 3*b*). Merchant Availability module is configured to respond to the buyer app with availability (yes/no), published sales hours (in UTC time zone and whether appointments are required), and greeting messages. The buyer's app may display any of this information as appropriate.

The conference factory module 620 creates a conferencing object and joins a buyer to it in standby state (step 3*d*). It then initiates identify merchant's module 622 (step 3*c*). The identify merchant's module 622 consults buyer's preferences (database not shown, and can include information such as spoken languages, merchants who have been favorited or blocked by the buyer, past merchant interactions, past and future appointments booked, etc.). The ring merchant's module (step 3*e*) queries the merchant presence service 612 (step 3*d*) for a list of available merchants. The merchants may be ranked in strict or non-strict order.

The identify merchants module 622 kicks off the ring merchants service module 624. The ring merchants module 624 service determines the numbers of merchants to ring and any delay interval between initiating the request (step 3*g*). The ring merchant's services module 624 rings one or more merchant apps (step 3*f*). The ring merchants service step 624 in parallel with step if and initiations the select merchant service module 622. The select merchant services module 622 determines which, if any, merchant to select based on which have answered the ring, the ranking of the identify merchants service module 622, and the elapsed time since starting the process. This logic has a maximum time limit set by the merchant but may execute faster under conditions such as many merchants have joined, no merchants are available etc. The selected merchant is brought out of standby and fully joins the conference, while any others who answered the ring are removed from the conference and are free to take other sales inquiries. The select merchant service module 622 notifies the buyer's app whether a merchant was selected, or if no merchant was joined at the time. The sales interaction then starts at sales interaction module 634 (step 2g).

Figure 7:
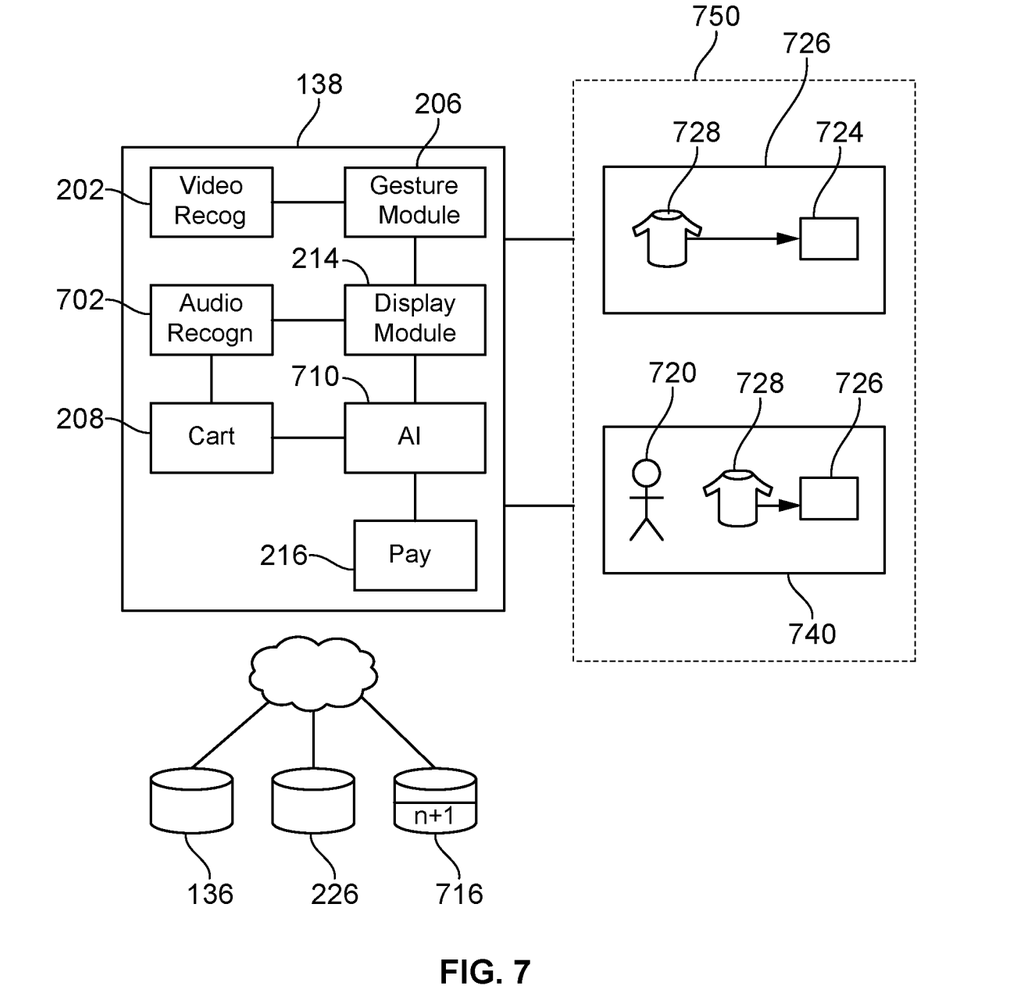
FIG. 7 illustrates a system for in-video shopping and shopping carts according to an embodiment of the present platform.

Referring now to FIG. 7, a system for in-video shopping and shopping carts according to an embodiment of the present platform is provided. The in-video 138 cart comprises a video recognition module 202, a customer optimizer module 204, a gesture recognition module 206, a persisted cart module 208, a stored item module 210, a share module 212, and a display configuration 214 as shown and described with relation to FIG. 2. In this embodiment, an audio recording module 702 is provided for voice recognition and is in communication with the gesture module 206. The video recognition module 202 is in communication with a merchandise database 226 and is configured to recognize an article or item in-video and match it to an item in the merchandise database 226. In operation, the merchandise database may be based on an e-commerce platform type database and all images of the articles are save therein. The video recognition module 202 utilizes video analytics, AI 710, and other forms of video recognition to match an item being shown in the video with the data and metadata associated with the item (e.g., price, color, size, brand).

The merchant UI and customer UI are shown at 750. The customer UI 726 comprises a videoconference showing an item at 728 and when ready for purchase, a persisted cart 724 (similar to 138 in FIG. 2) populates. The merchant UI 740 shows the customer 720, an item 722 the merchant is showing and a persisted cart 726 when ready for a purchase. The merchant and the customer can see each other on video together with the item to be purchased 728. The persisted carts 724 and 726 are shown in the UI, and in operation, during a video conference shopping session when the merchant is showing the shop or an item in the system automatically recognizes what article is being shown during the actual video shopping process. This allows the system to prepare that item for purchase if the buyer would like to purchase it from the merchant.

In operation, the merchant is showing item 726 that the buyer would like to buy in video, the buyer can use a finger, audio, or other gesture (e.g., their mouse to drag) that item across the screen into the persisted cart 724 or 726 (208 in FIG. 2) where it is digitized into an e-commerce style item (e.g., live item to digitized item). While using a finger to drag drop or a mouse to drag drop is useful in embodiments any other gesture maybe used herein. The persisted carts 726 and 724 are configured to populate both a user interface and an merchant interface with a graphical cart (e.g., e-commerce cart). Thus, when a user would like to purchase utilizes the persisted cart module to be populated, automatically, on both the merchant UI and the buyer UI so that each can see the items in the cart utilizing the stored item module 210. The stored item module 210 is in communication with persisted cart 208 and configured to save the items in the cart for later viewing by either the buyer or the merchant. An additional database 716 is provided to show aggregate databases that may be used herein to pull information from.

Figure 8:
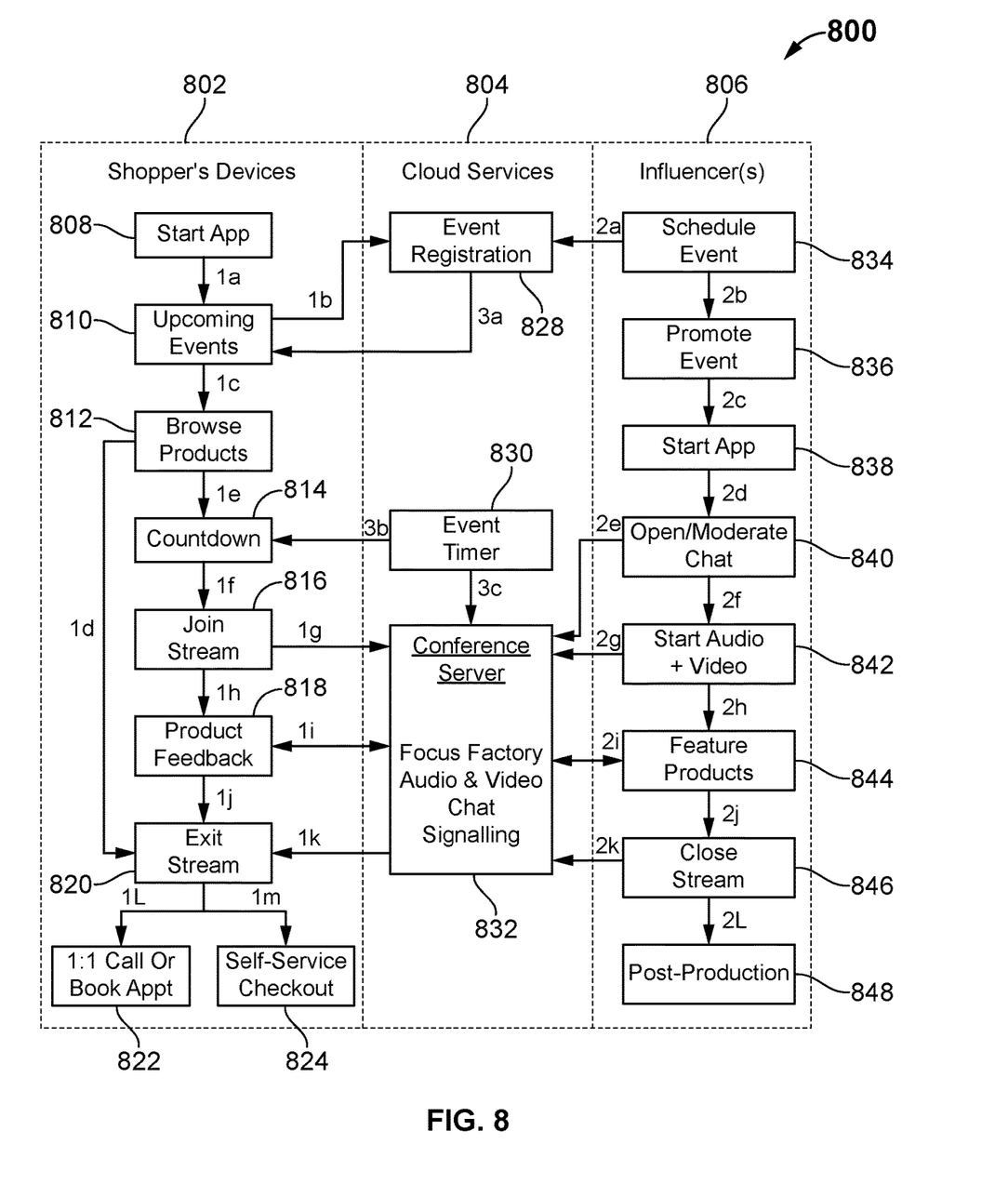
FIG. 8 illustrates a method user's making purchases via a videotelephonic platform according to an embodiment of the present platform according to an embodiment of the present platform.

Referring now FIG. 8 a combination system method user's making purchases via a videotelephonic platform according to an embodiment of the present is shown. In this embodiment, buyers engage with the application at 802, cloud services 804 and influencers 806. The buyer may begin by opening the app 808 on their device, either unprompted, or when being notified of an upcoming event through an SMS, social media messages, or the like (step 1a). When buyer opens the app, it queries the Event Registration server 828 for live shopping events that are upcoming and in progress (step 1b). The buyer may be able to register for an upcoming event. The buyer may browse products 812, view pre-recorded videos, or engage in other features of the app. Without participating in a live event, the buyer may proceed at any time with zero or more products in their cart(s) to the 1:1 sales call flow, or self-service checkout (step 1d) and checkout or book at a call (step 1L and step 1m).

If notified by the event timer service 830 that a live event is about the start, the app may show a banner or other notification. If the buyer tries the join the event, they may see a countdown 814 until the event is open to attendees (step 1e, step 3b). When the live event starts, the buyer may elect to join, or else not join 816 (step 1f) and continue using other app features including product feedback 818 (step 1h). In operation, the buyer's app joins 816 the conference at conference server 832 (step 1g). Upon doing so, the buyer may view the chat of other participants and post their own chat messages. A buyer will also be able to view the influencer's video if not paused and audio if not muted. While the buyer is connected to conference (chat, audio, video), they may be also be presented products digitally for their consideration. The buyer can accept or reject items into their various carts, and can further select variations (e.g., size, color.) If multiple products are presented as a "poll", the buyer will be able to vote for the product they most favor and may be able to further see the vote counts or percentages for all the products. When the poll is closed, as before they can decide whether add one or more products to a cart. The buyer may exit 820 the live event or any time before it ends. The buyer will exit 820 the live event if ejected by a moderator or the event is terminated by one of the influencers. The buyer may proceed to the 1:1 sales interaction 822 with the items in their cart. They may be able to connect with a live sales agent or otherwise book an appointment or send an inquiry.

One or more influencers run the live streaming event at 806. They can schedule an event at 830 (step 2a) for promote an event at 836 (step 2b) and start the app at 838 which will open and moderate chat 840. The influencer can start audio video streaming at 842, feature products at 844, includes the stream at 846 while performing postproduction at 848. While multiple influencers may be co-located and share a single camera or even a single microphone, for simplicity this flow will assume each influencer joins the conference independently. An influencer or another person acting in an organizer role can schedule a live event. This step can be performed in a web browser that does not have to be on the mobile device that will be used to start the event. An influencers or organizers can market the event using a URL. The URL will take buyers to install the app if they don't have it, or view the event in the app. At any time, even before the scheduled start of the event, an influencer can start the app and prepare to start the event.

An influencer can open the event to chat interactions 840 and start audio video 842 and feature products 844. The influencers or other persons designated as moderator(s) can eject unruly participants, change the maximum message length or rate, and other typical event controls. A moderator does not need to join the audio/video stream but may in some instances.

The influencer's app sends a request (step 2g) to the conference server 832 to open the live event. Each influencer can start their audio and video stream when they are ready 842. The influencer's app connects their audio and video inputs to the conference. An influencer may choose to talk about products and show them over the video. Optionally an influencer can also select one or more products from the catalog and present them digitally to the buyers. If two or more products are selected, a live poll may be started. Buyer votes may be cast or changed at any time during the poll. The votes are tabulated and updated, and the results may be shown at any time or not at all by the influencer. Any influencer can decide whether to exit the event or terminate its 8464 (step 2*j*) for all participants. The influencer's app signals their exit or terminate to the conference server 832 (step 2*k*). After the event, an influencer or another person designated as an organizer can produce a repayable recording of the event including audio, video, screen share, and chat streams. They may overlay digital products and poll result during postproduction 848 (step 2L). They can collect metrics including attendee count, cart adds/deletes, purchases, appointment bookings, 1:1 sales call, abandoned carts etc.

Cloud services 804 prepare buyers and influencers for a live shopping event. The Event Registration Service maintains a list of upcoming events. If an event is added, canceled, or rescheduled, the service will notify the buyer applications of the change. The notification may be delivered through an in-app notification. If the app is closed, the notification may be in the form of an SMS or email for example. The Event Timer Service 830 maintains for each event the countdown 814 period of zero or more minutes before the start of the event. When the countdown time has reached, the Event Timer Service 830 notifies the buyer's applications accordingly (step 3*b*). The Conference Server 832 handles creation of the conference focus, streaming of audio and video, and signaling such as starting the countdown, digital product presentation, and pools.

A "influencer broadcast" shopping conference, where Merchants discuss and/or demonstrate various Products. Through signaling, a Merchant can have Products added to a multitude of Carts. Each Buyer may then further modify the Carts and make their own purchase decisions. A "product contest" shopping conference, where Buyers can indicate their preference for two or more alternative Products through upvote/downvote signaling or other commentary. Either a Merchant or a Buyer can determine a single Product to remain in the Cart, while the other Products are removed from it. The resulting Cart may be replicated to other Carts.

While the present system has been described in connection with what are presently considered to be the most practical and preferred embodiments, it is to be understood that the present system is not limited to these herein disclosed embodiments. Rather, the present system is intended to cover all of the various modifications and equivalent arrangements included within the spirit and scope of the appended claims.

Although specific features of various embodiments of the system may be shown in some drawings and not in others, this is for convenience only. In accordance with the principles of the system, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

We claim:

1. A system for data and signal routing for video conferencing, the system comprising:

a video conference server configured to host a video conference;

a merchandise database comprising data relating to a plurality of articles;

a customer user interface in communication with the video conference server, wherein the customer user interface is configured to show a merchant in a live video conference;

a scheduling module, configured to, in response to an input from the customer regarding a product, generate a conference channel and a call request to schedule the video call, wherein the call request comprises data to locate the merchant;

a conference factory module configured to receive merchant data at the video conference server, a select merchant services module configured to determine which merchant is selected based on a ranking of the merchants and the elapsed time since a video call request;

a video recognition module in communication with the merchandise database and the video conference server, wherein the video recognition module is configured to recognize the article in-video during the live video conference in the merchant user interface and match it to one of the plurality of articles in the merchandise database;

a persisted cart module wherein the persisted cart module is, configured to automatically populate both a customer user interface cart associated with the customer and a merchant user interface cart associated with the merchant with a graphical cart that appears in-video on both user interfaces;

a display configuration module in communication with the persisted cart module, wherein the display configuration module is configured to store it in the cart on both user interfaces.

2. The system of claim 1, further comprising:

a stored item module in communication with the persisted cart module, wherein the stored item module is configured to save the article in the persisted cart for purchase by the customer.

3. The system of claim 1, further comprising a share module configured to allow the customer to share the article in cart with other customers in-video.

4. The system of claim 1, further comprising a payment processing module configured to communicate with a customer database and pull payment information connected to the customer for a purchase.

5. The system of claim 4, further comprising a customer optimization module in communication with the merchandise database and the customer database, wherein the customer optimization module is configured to use data from previous customers to perform a matching process based on at least a past purchase by the customer.

6. The system of claim 1, further comprising a merchant customization module in communication with a merchant database, wherein the merchant customization module is configured to recognize the merchant and automatically convert at least one setting based on the merchant database.

7. The system of claim 1, wherein the video recognition module utilizes a neural network to match the article being shown in-video with the data and metadata associated with the article.

8. A non-transitory computer-readable medium for storing instructions that, when executed on one or more processors, cause the one or more processors to:

create a videoconference session for a customer and a merchant;

query a merchandise database, wherein the merchandise database comprises data related to a plurality of articles;

in response to an input from the customer regarding a product, generate a conference channel and a call request to schedule the video call, wherein the call request comprises data to locate the merchant;

receive merchant data at the video conference server;

determine which merchant is selected based on a ranking of the merchants and the elapsed time since a video call request;

connect a customer user interface with a merchant user interface to start the videoconference session, wherein the customer user interface is configured to show a merchant in a live video conference, wherein the merchant user interface is configured to show a customer and at least one of the plurality of articles in the live video conference;

during the live video conference, in response to an article being shown in the live video conference, recognize the article in-video and match it to one of the plurality of articles in the merchandise database;

automatically populate, both the customer user interface associated with the customer and the merchant user interface associated with the merchant with a persisted cart that appears in-video on both of the user interfaces.

9. The non-transitory computer-readable medium of claim 8, further configured to, when executed, cause the one or more processors to save the article in the persisted cart for purchase by the customer.

10. The non-transitory computer-readable medium of claim 8, further configured to, when executed, cause the one or more processors to allow the customer to share items in cart with other customers in-video.

11. The non-transitory computer-readable medium of claim 8, further configured to, when executed, cause the one or more processors to communicate with a customer database and pull payment information connected to the customer for a purchase.

12. The non-transitory computer-readable medium of claim 11, further configured to, when executed, cause the one or more processors to further communicate with a merchandise database and the customer database and use data from previous customer to perform a matching step based on at least a past purchase by the customer.

13. The non-transitory computer-readable medium of claim 8, further configured to, when executed, cause the one or more processors to recognize the merchant and automatically convert at least one setting based on the merchant database.

14. The non-transitory computer-readable medium of claim 8, further configured to, when executed, cause the one or more processors to utilizes a neural network to match an article being shown in-video with data and metadata associated with the article.

15. A method for data and signal routing for telephonic conferencing including a client device, and a server, wherein the server comprises a memory to store instructions and a processor coupled with the memory to process the stored instructions, the method comprising the steps of:

creating a live videoconference session for a customer and a merchant;

querying a merchandise database comprising data relating to a plurality of articles in response to an article being shown in the live video conference, connecting a customer user interface with a merchant user interface to start the videoconference session, wherein the customer user interface is configured to show a merchant in a live video conference, and wherein the merchant user interface is configured to show a customer and at least of the one of the plurality of articles in the live video conference;

in response to an input from the customer regarding a product, generating a conference channel and a call request to schedule the video call, wherein the call request comprises data to locate the merchant;

receiving merchant data at the video conference server;

determining which merchant is selected based on a ranking of the merchants and the elapsed time since a video call request;

during the live video conference, recognize the article in-video and match it to one of the plurality of articles in the merchandise;

automatically populate both the customer user interface associated with the customer and the merchant user interface associated with the merchant with a persisted cart that appears in-video on both of the user interfaces.

16. The method of claim 15, further comprising saving the article in the persisted cart for purchase by the customer.

17. The method of claim 15, further comprising allowing the customer to share items in cart with other customers in-video.

18. The method of claim 15, further comprising communicating with a customer database and pull payment information connected to the customer for a purchase.

19. The method of claim 15, further comprising communicating with a merchandise database and the customer database and use data from previous customer to perform a matching step based on at least a past purchase by the customer.

* * * * *